United States Patent Office

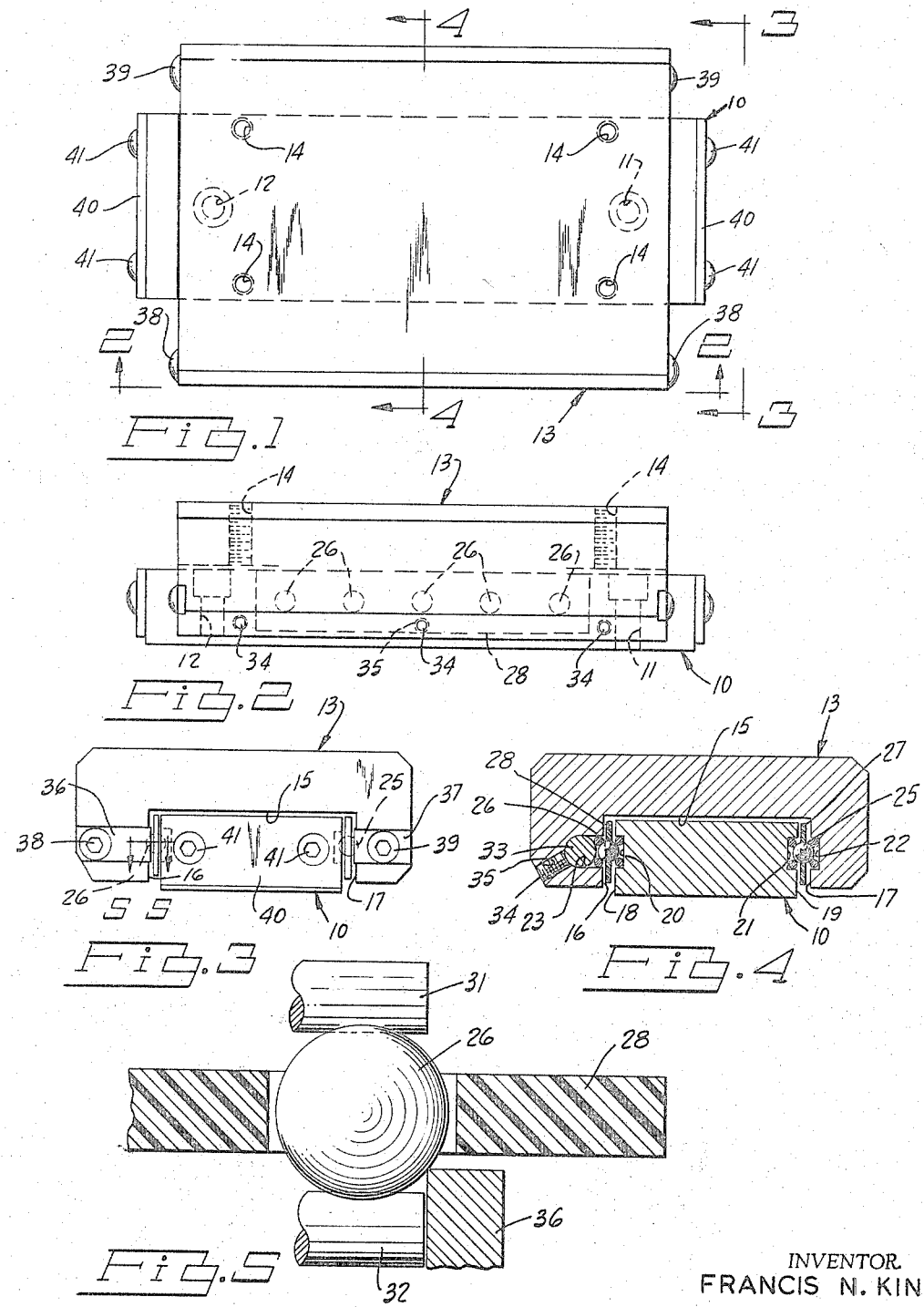

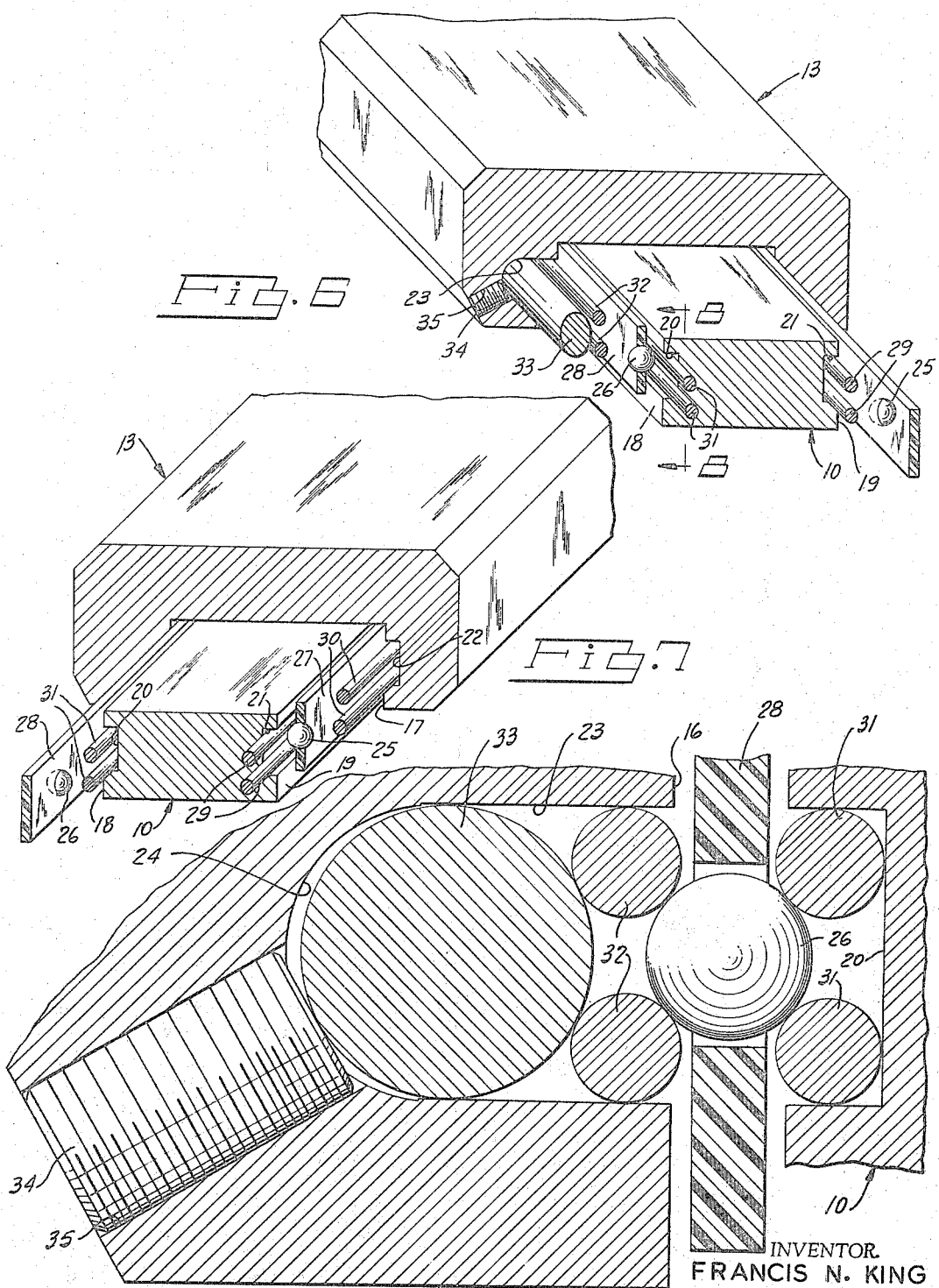

3,342,534
Patented Sept. 19, 1967

3,342,534
BALL SLIDE ASSEMBLY
Francis N. King, Farmington, Mich., assignor to Grace & Hornbrook Manufacturing Co., Southfield, Mich., a corporation of Michigan
Filed Apr. 12, 1965, Ser. No. 447,325
2 Claims. (Cl. 308—6)

ABSTRACT OF THE DISCLOSURE

A ball slide for mounting a precision gage and which is provided with rectilinear bearing assemblies having a laterally adjustable elongated cylindrical rod for adjusting the pre-load on the elongated rods which carry the ball bearings.

This invention relates to ball slide assemblies, and more particularly to a novel ball slide construction for use with precision gages and other apparatus.

In the gage art it is desirable in some instances to mount a gage on a ball slide which is movable in a rectilinear movement. Ball slide assemblies are used to maintain precision alignment during rectilinear movement of the slide. Rectilinear bearing assemblies employed in ball slide assemblies of this type are manufactured to precision accuracy, and in mounting them in a ball slide construction the ball bearing means is usually put under a pre-load. Heretofore, the adjusting of the pre-load on the ball bearing means has been accomplished in different ways. Examples of prior art ball slide assemblies are shown in U.S. Patents Nos. 3,113,807 and 3,145,065. In the first mentioned patent the means for adjusting the pre-load on the ball races includes the tapered gib which must cooperate with a similarly inclined or tapered surface formed on one part of the ball slide assembly. The tapers or inclined surfaces on the gib and the portion of the ball slide assembly known as the block must be perfectly matched or the adjustment means will not function properly in relation to the precision bearing means. This is a disadvantage of devices employing such adjustment means.

Accordingly, it is an important object of the present invention to provide a novel ball slide construction having an improved means for adjusting the pre-load on the ball races.

It is another object of the present invention to provide a novel ball slide construction in which the pre-load on the ball bearing means may be adjusted simply and quickly after final assembly to compensate for manufacturing tolerances, and also for wear after use.

It is still another object of the present invention to provide a novel and improved ball slide construction which is simple and compact in construction, and efficient in operation.

It is a further object of the present invention to provide a novel and improved ball slide construction which may be used in any position, that is, horizontally, vertically or upside down.

It is still a further object of the present invention to provide a novel and improved ball slide consrtuction which includes a base, a slide movably supported on the base by a pair of ball bearing means, each of said ball bearing means comprising a first pair of guide rods mounted on the base and a second pair of guide rods mounted on the slide with the ball bearings rotatably mounted between the two pair of guide rods, and adjustment means for maintaining a pre-load on the bearing means including an elongated adjustment rod disposed in engagement with one of said pair of guide rods with means for moving the adjustment rod toward and away from the guide rods.

Other objects, features and advantages of this invention will be apparent from the following detailed description, appended claims, and accompanying drawings.

In the drawings:

FIG. 1 is a top plan view of a ball slide assembly made in accordance with the principles of the present invention;

FIG. 2 is a front elevational view of the structure illustrated in FIG. 1, taken along the line 2—2 thereof, and looking in the direction of the arrows;

FIG. 3 is a right side elevational view of the structure illustrated in FIG. 1, taken along the line 3—3 thereof, and looking in the direction of the arrows;

FIG. 4 is an elevational sectional view of the structure illustrated in FIG. 1, taken along the line 4—4 thereof, and looking in the direction of the arrows;

FIG. 5 is a fragmentary, enlarged, horizontal sectional view of the structure illustrated in FIG. 3, taken along the line 5—5 thereof, and looking in the direction of the arrows;

FIG. 6 is a fragmentary, enlarged, perspective view taken from one side of the structure of FIG. 3, with parts in section and parts removed, and showing the novel and improved means for adjusting the pre-load on the ball bearing means;

FIG. 7 is a fragmentary, enlarged, perspective view taken from the other side of the structure of FIG. 3, with parts in section and parts removed, and showing the ball bearing means on the other side of the ball slide assembly; and, FIG. 8 is a fragmentary, enlarged, elevational sectional view of the structure illustrated in FIG. 6, taken along the line 8—8 thereof and looking in the direction of the arrows.

Referring now to the drawings and in particular to FIGS. 1 through 4, the numeral 10 generally indicates a base member which is adapted to be operatively in any suitable position by means of bolts passing through the bolt holes 11 and 12. The numeral 13 generally indicates the slide or block which is movably mounted on the base 10, as more fully described hereinafter.

The slide 13 is adapted to support the gage or other device on the upper surface thereof, and is provided with a plurality of bolt holes 14 on the upper surface for threadably receiving anchor bolts for the gage or other apparatus. The slide 13 is adapted to reciprocate in a horizontal plane, and it straddles the base 10. As seen in FIGS. 3 and 4, the slide 13 is provided with a longitudinally extended rectangular recess on the lower side thereof which is bounded by the upper wall 15 and the side walls 16 and 17. The base 10 is disposed in the recess with the opposite sides 18 and 19 thereof disposed opposite to the recess wall 16 and 17, respectively.

As best seen in FIGS. 6 and 7, the opposite sides 18 and 19 of the base 10 are provided with a longitudinally extended rectangular recess as 20 and 21, respectively.

As shown in FIGS. 4 and 7, the confronting wall 17 of the recess in the slide 13 is provided with a similar longitudinally extended recess or groove 22. The opposite recess wall 16 is provided with a longitudinally extended recess 23 which is in confronting position with the recess 20 in the base 10, but which is extended inwardly into the slide for a greater distance and which terminates in the curved or concave end wall 24.

As best seen in FIGS. 4, 6 and 7, the slide 13 is movably supported on the base 10 by a plurality of bearing balls 25 on one side and a plurality of bearing balls 26 on the other side. The balls 25 are longitudinally spaced apart by and carried in suitable holes on a spacer 27 which is an elongated sheet of material made from a low friction material of any suitable type. The spacer 27 may also be termed a ball carrier, and a suitable material is tetrafluoroethylene resin or "Teflon" which is a polymerized tetrafluoroethylene. The ball carrier 27 is provided with spaced apertures for receiving the balls 25. The balls 26 are carried on a similar ball spacer or carrier 28.

As best seen in FIG. 7, the balls 25 ride on two pairs of guide or bearing rods indicated by the numerals 29 and 30, which are disposed in the grooves 21 and 22 in the base and slide, respectively. It will be seen that the bearing rods 29 and 30 are disposed in the upper and lower corners of their respective grooves since the grooves are rectangular in cross section.

As best seen in FIGS. 6 and 8, the balls 26 are rollably supported on a similar guide rod construction. A first pair of bearing or guide rods 31 are disposed in the groove or recess 20 on the base 10, and a similar pair of bearing or guide rods 32 are disposed in the recess 23 on the slide 13.

The ball bearing means is adapted to be put under a pre-load by the following described structure. An adjusting means is provided which includes the elongated round rod 33 which is disposed in the recess 23 in the slide 13. The rod 33 is adapted to be slidably mounted in the recess 23 for inward and outward movement toward and away from the guide rods 32. The recess or elongated groove 23 is provided with parallel upper and lower surfaces and is slightly larger than the diameter of the adjustment rod 33 to permit the rod 33 to be moved either with a rolling or sliding action in the groove 23. The adjustment rod 33 is adapted to be moved inwardly toward the guide rods 32 by means of a plurality of adjustment screws 34 which are mounted in suitable threaded holes 35, as shown in FIGS. 2, 4 and 8. The adjustment screws 34 are disposed lengthwise of the slide 13 in spaced apart positions.

It will be seen that when the screws 34 are threaded inwardly, the adjustment rod 33 is moved inwardly to the right, as viewed in FIG. 4, and a pre-load may be established on both series of bearing balls 25 and 26. The pre-load on both sets of bearings is adjusted simultaneously by the single adjustment of the member 33. The precision of the adjustment means of the present invention is ground into the slide and base and requires only parallel surfaces and square surfaces for elongated circular guide rods and adjustment rods to bear against. The adjustment rod 33 extends inwardly, as shown in FIG. 8, between the guide rods 32 in an even manner against these guide rods, and forces them inwardly along the parallel surfaces of the groove 23. It will be seen that the adjustment means of the present invention is a much simpler device to make and use, and that there are no mating tapered surfaces which must be provided and maintained.

As shown in FIG. 3, the guide rods 32 and 30 are retained within their respective grooves in the slide 13 by means of the end plates 36 and 37 which are disposed in suitable grooves on the end of the slide 13 and retained therein by any suitable means, as by the bolts 38 and 39. The inner ends of the end plates 36 and 37 extend over the adjacent grooves and engage the outer ends of these guide rods, as shown in FIG. 5. The slide is provided with a similar set of end plates on the other end thereof.

As shown in FIG. 3, the base 10 is provided with a retainer end plate 40 which is secured to the end of the base 10 by the bolts 41, and which extends sidewardly over the grooves 20 and 21 to retain the guide rods 31 and 29 in said grooves, respectively. The slide is provided with a similar retainer plate on the opposite end thereof.

It will be understood that the ball slide of the present invention may be made to any desired size for operatively supporting a gage.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A ball slide assembly comprising: an elongated base; a slide movably supported on the base by a pair of ball bearing means; each of said ball bearing means comprising a first pair of generally cylindrical guide rods mounted on the base, a second pair of generally cylindrical guide rods mounted on the slide, and a plurality of ball bearings rollably mounted between the two pair of guide rods; and, adjustment means maintaining a pre-load on the pair of ball bearing means including an elongated cylindrical adjustment rod disposed in an elongated recess in the base, and having the curved inner side thereof in engagement with the curved outer sides of one pair of guide rods in one of the pair of ball bearing means, said elongated recess having parallel plane upper and lower walls; said one pair of guide rods engaged by the adjustment rod being disposed in said recess and having their curved inner sides engaged with the ball bearings; and, means in said base engageable with the outer side of the adjustment rod for moving the adjustment rod perpendicularly toward and away from the guide rods to adjust the pre-load on the ball bearing means.

2. A ball slide assembly as defined in claim 1, wherein: said means for moving the adjustment rod toward and away from the guide rods comprises a plurality of adjustably mounted screws adapted to bear against the outer side of the adjustment rod.

References Cited

UNITED STATES PATENTS

| 2,343,575 | 3/1944 | Penney | 308—6 |
| 3,076,682 | 2/1963 | Brault | 308—6 |
| 3,113,807 | 12/1963 | Polidor | 308—6 |
| 3,145,065 | 8/1964 | Cator | 308—6 |
| 3,190,703 | 6/1965 | Thomson | 308—6 |

FOREIGN PATENTS

| 1,124,901 | 10/1956 | France. |
| 133,416 | 10/1919 | Great Britain. |
| 245,763 | 11/1946 | Switzerland. |

MARTIN P. SCHWADRON, *Primary Examiner.*

L. L. JOHNSON, *Assistant Examiner.*